(12) United States Patent
Ambroz et al.

(10) Patent No.: US 9,446,710 B2
(45) Date of Patent: Sep. 20, 2016

(54) RAIL VEHICLE EMERGENCY LIGHTING

(75) Inventors: Anton Ambroz, Vienna (AT); Klaus Ulreich, Pinkafeld (AT)

(73) Assignee: Siemens AG Oesterreich, Vienna (AT)

( * ) Notice: Subject to any disclaimer, the term of this patent is extended or adjusted under 35 U.S.C. 154(b) by 599 days.

(21) Appl. No.: 13/805,473

(22) PCT Filed: May 19, 2011

(86) PCT No.: PCT/EP2011/058168
§ 371 (c)(1),
(2), (4) Date: Dec. 19, 2012

(87) PCT Pub. No.: WO2011/160903
PCT Pub. Date: Dec. 29, 2011

(65) Prior Publication Data
US 2013/0106285 A1    May 2, 2013

(30) Foreign Application Priority Data

Jun. 21, 2010   (AT) ................ A 1020/2010

(51) Int. Cl.
*B60Q 1/14*       (2006.01)
*B60Q 3/02*       (2006.01)
*B61D 29/00*      (2006.01)
*H02J 9/02*       (2006.01)
*H05B 33/08*      (2006.01)

(52) U.S. Cl.
CPC ........... *B60Q 3/0293* (2013.01); *B60Q 3/0256* (2013.01); *B61D 29/00* (2013.01); *H02J 9/02* (2013.01); *H05B 33/0845* (2013.01)

(58) Field of Classification Search
CPC .................................................. B60Q 3/0293
USPC ........................................................ 315/77
See application file for complete search history.

(56) References Cited

U.S. PATENT DOCUMENTS

| | | | | |
|---|---|---|---|---|
| 6,502,044 B1* | 12/2002 | Lane | ..................... | H02J 7/0029 363/101 |
| 7,218,056 B1 | 5/2007 | Harwood | | |
| 2005/0104740 A1* | 5/2005 | Stokes | .................. | B64D 10/00 340/815.45 |
| 2006/0146553 A1* | 7/2006 | Zeng | ..................... | B60Q 3/001 362/488 |
| 2006/0238032 A1* | 10/2006 | Nitta | .................... | G11B 19/047 307/64 |
| 2009/0026961 A1 | 1/2009 | Lin | | |

FOREIGN PATENT DOCUMENTS

| | | | | |
|---|---|---|---|---|
| DE | 19746854 A1 | * | 5/1999 | ............ G09F 13/04 |
| DE | 19746854 A1 | * | 5/1999 | ............ G09F 13/04 |
| DE | 29924584 U1 | | 1/2004 | |
| DE | 102006032249 A1 | | 1/2008 | |
| EP | 1431158 A1 | | 6/2004 | |
| EP | 1544074 A1 | | 6/2005 | |
| GB | 2409023 A | | 6/2005 | |
| JP | 2006140067 A | | 6/2006 | |
| KR | 20050115587 A | | 12/2005 | |
| UA | 58075 C2 | | 7/2003 | |
| UA | 31002 U | | 3/2008 | |

\* cited by examiner

*Primary Examiner* — Sibin Chen
*Assistant Examiner* — Metasebia Retebo
(74) *Attorney, Agent, or Firm* — Laurence Greenberg; Werner Stemer; Ralph Locher

(57) ABSTRACT

A rail vehicle emergency lighting system for a rail vehicle includes a main lighting system with light emitting diodes. When a main lighting power supply is active, the light emitting diodes of the main lighting system are lit with a main lighting intensity. When the main lighting power supply fails, the light emitting diodes of the main lighting system are lit with an emergency lighting intensity. The emergency lighting intensity is reduced compared to the main lighting intensity.

6 Claims, 3 Drawing Sheets

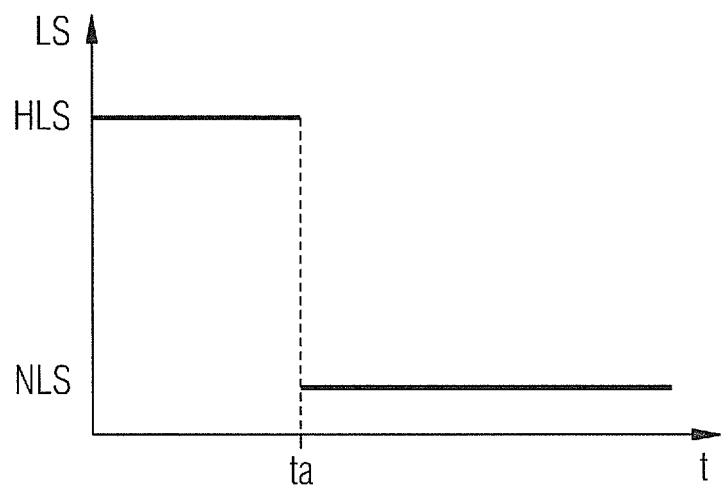
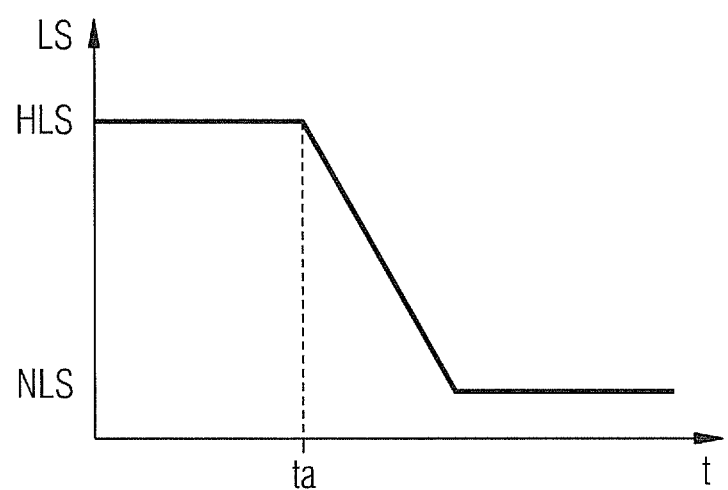

RAIL VEHICLE EMERGENCY LIGHTING

CROSS REFERENCE TO RELATED APPLICATIONS

This application is the U.S. National Stage of International Application No. PCT/EP2011/058168 filed May 19, 2011, and claims the benefit thereof. The International Application claims the benefits of Austrian Application No. A1020/2010 filed Jun. 21, 2010. All of the applications are incorporated by reference herein in their entirety.

TECHNICAL FIELD

The invention relates to rail vehicle emergency lighting.

PRIOR ART

Rail passenger vehicles are equipped with electrical emergency lighting which allows the passengers to orientate themselves in the vehicle. These emergency lighting systems are usually supplied from dedicated batteries and illuminate the interior of the vehicle when an external power supply is unavailable. The emergency lighting uses individual selected lamps of the main lighting which are supplied from the emergency circuit and therefore remain operative even when the lamps supplied by the main power supply go out. In rail passenger vehicles, 20% to 30% of the lamps are typically supplied from the emergency circuit. The light sources used are usually fluorescent lamps or incandescent light bulbs. Said light sources emit light over a large surface area and do not therefore cause dazzle. In an emergency lighting situation when only some of the lamps are in operation, there is usually even less risk of passengers being dazzled. This dazzle effect must be limited to a particular value as defined in the EN 13272 standard applicable to rail passenger vehicles. Because of their long service life and energy efficiency, light emitting diodes (LEDs) are more recently being used as light sources in preference to the above. These LEDs have properties which appear to lend themselves particularly well to use in rail vehicles. In addition to providing long service life and energy efficiency, LEDs are extremely robust and compact. The high energy efficiency of the LEDs further manifests itself in low heat generation and therefore simplified installation. However, LEDs cannot be connected directly to the power supply of a rail vehicle, but require an electronic ballast which provides the required (low) operating voltage. Nevertheless, the small size of LED light sources means high luminance which can cause dazzle. However, the current design of emergency lighting systems in which only some of the lamps remain operative during emergency lighting mode results in unacceptable dazzle if LEDs are used.

SUMMARY OF THE INVENTION

It is an object to specify rail vehicle emergency lighting which minimizes the dazzle effect on passengers even when LEDs are used as light sources.

This object is achieved by rail vehicle emergency lighting having the features as claimed in the independent claim. Advantageous embodiments are set forth in the dependent claims.

According to the basic concept of the invention, all the LED light sources of a rail vehicle passenger compartment lighting system are used as emergency lighting and are supplied from different emergency light circuits. The same lamps or light sources are used as both main lighting and emergency lighting. In emergency lighting mode, all the light sources used for the main lighting remain in operation, but with reduced luminous intensity.

As a result it is advantageously possible to construct a dazzle-free rail vehicle emergency lighting system using LEDs as light sources.

The present invention enables the relative light distribution in a rail vehicle to be left unchanged when the emergency lighting comes on, thereby ensuring that passengers can orient themselves spatially without being dazzled.

Another advantage of the invention is that the transition of the luminous intensity between main and emergency lighting can be freely designed. In particular, a delayed reduction in luminous intensity, a stepless transition or a time-phased, multi-step transition from the main lighting intensity to the emergency lighting intensity are advantageous.

As an electronic ballast which, among other things, reduces the normal rail vehicle electrical system voltage to the LED operating voltage is required for operating LEDs, the electronic circuitry required for reducing the luminous intensity can be incorporated in said ballast.

It is additionally advantageous to take the energy supply of the rail vehicle passenger compartment lighting from the emergency power supply and feed the main power supply as a control signal to the electronic ballast. This ensures reliable emergency lighting, as energy is always supplied to the entire lighting system from the constantly available emergency power supply. During normal operation (with main power supply operative) the battery of the emergency power supply is continuously charged so that said battery is not discharged by the power consumption of the main lighting.

BRIEF DESCRIPTION OF THE DRAWINGS

By way of example:

FIG. 3 shows the transition between the main and the emergency lighting luminous intensity as a function of time—immediate transition.

FIG. 4 shows the transition between the main and the emergency lighting luminous intensity as a function of time—stepless transition.

EMBODIMENT OF THE INVENTION

Figure 1:
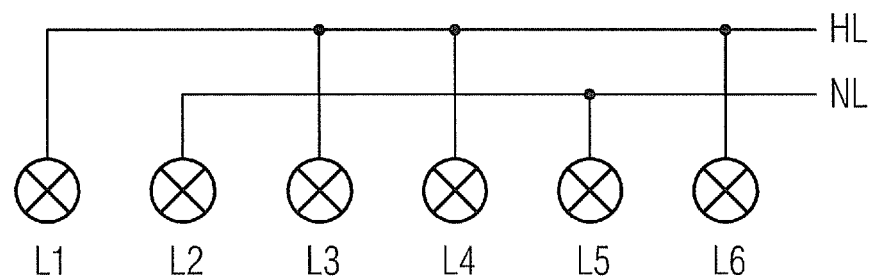
FIG. 1 shows a block diagram of a rail vehicle passenger compartment lighting system.

FIG. 1 shows by way of example a block schematic diagram of a rail vehicle passenger compartment lighting system. The lighting shown comprises six lamps L1 ... L6, wherein the lamps L1, L3, L4 and L6 are supplied from the main lighting power supply HL and the lamps L2 and L5 from the emergency lighting power supply NL. If the main lighting power supply HL is unavailable, the emergency lighting comes on, in which mode the lamps L2 and L5 are in operation. Due to the reduced number of lamps or light sources in operation, dazzling may occur. Particularly when LED light sources are used, this effect is virtually unavoidable.

Figure 2:
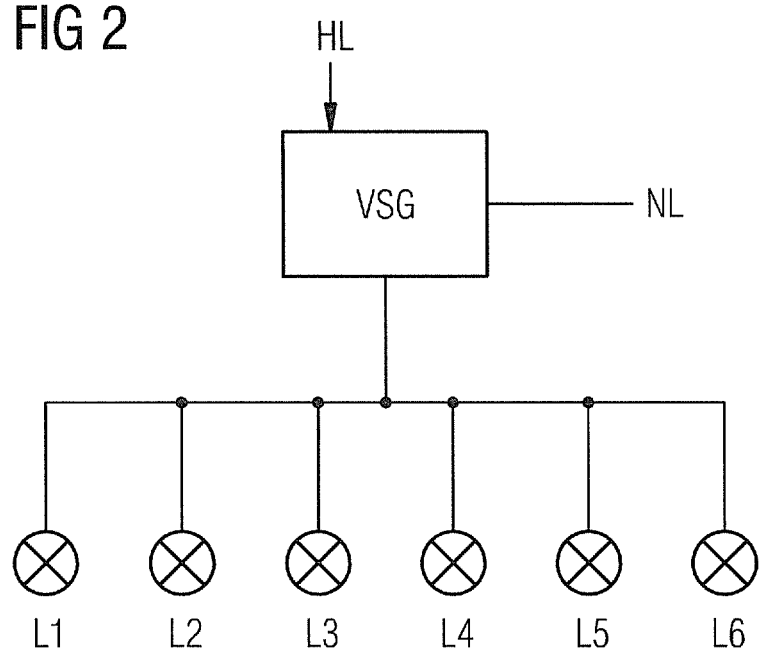
FIG. 2 shows a block diagram of a rail vehicle passenger compartment lighting system having emergency lighting according to the invention.

FIG. 2 shows by way of example a block schematic diagram of a rail vehicle passenger compartment lighting system with emergency lighting according to the invention. The lighting shown comprises six lamps L1 . . . L6, a ballast VSG, a main lighting power supply HL and an emergency lighting power supply NL. The ballast VSG provides the operating voltage required for operating the lamps L1 . . . L6, which voltage can be much lower than the voltage of the main lighting power supply HL and of the emergency lighting power supply NL particularly when LED light sources are used. When the main lighting is in operation, all the lamps L1 . . . L6 are lit with the main lighting intensity HLS. In emergency lighting mode, all the lamps L1 . . . L6 are lit just as in main lighting mode, but with a different (lower) emergency lighting intensity NLS from that of the main lighting intensity HLS.

FIG. 3 schematically illustrates by way of example the transition between the main and the emergency lighting luminous intensity as a function of time. It plots how the luminous intensity LS of a rail vehicle passenger compartment lighting system changes over time. The vertical axis represents the luminous intensity LS, the horizontal axis represents the time t. At a failure instant ta, the luminous intensity LS is reduced from the main lighting intensity HLS to the emergency lighting intensity NLS.

FIG. 4 schematically illustrates by way of example the transition between the main and the emergency lighting luminous intensity. Similarly to FIG. 3, is shows the transition of the luminous intensity LS from the main lighting intensity HLS to the emergency lighting intensity NLS. In this exemplary embodiment there is a stepless transition from the main lighting intensity HLS to the emergency lighting intensity NLS.

Figure 5:
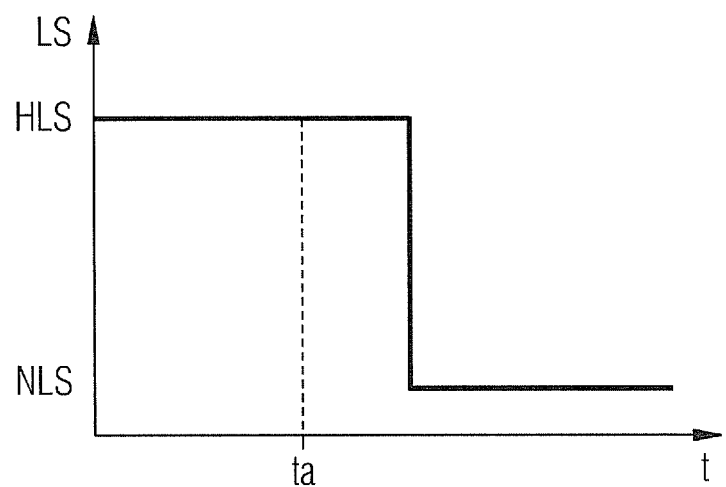
FIG. 5 shows the transition between the main and the emergency lighting luminous intensity as a function of time—delayed transition.

FIG. 5 schematically illustrates by way of example the transition between the main and the emergency lighting luminous intensity as a function of time. In this exemplary embodiment, a transition from the main lighting intensity HLS to the emergency lighting intensity NLS is time-delayed with respect to the failure instant ta.

Figure 6:
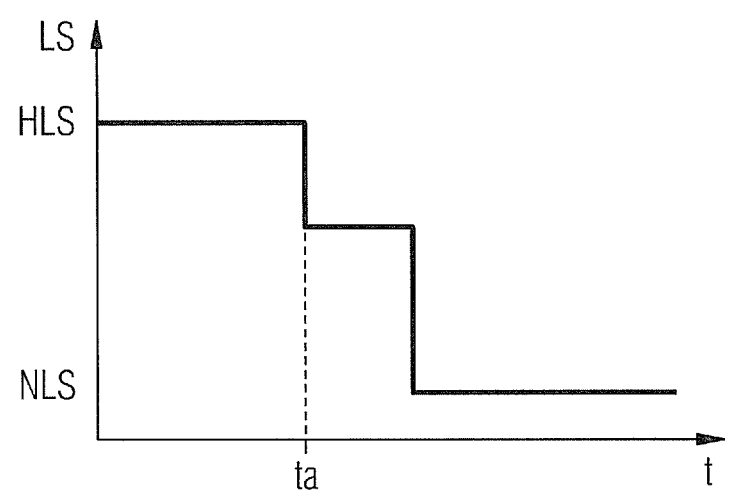
FIG. 6 shows the transition between the main and the emergency lighting luminous intensity as a function of time—stepped transition.

FIG. 6 schematically illustrates by way of example the transition between the main and the emergency lighting luminous intensity as a function of time. In this exemplary embodiment, there is a stepped transition from the main lighting intensity HLS to the emergency lighting intensity NLS.

The invention claimed is:

1. A rail vehicle emergency lighting system for a rail vehicle, comprising:
    a main lighting system containing a multiplicity of light emitting diodes, wherein,
    when a main lighting power supply is active, the light emitting diodes of the main lighting system are lit with a main lighting intensity and,
    when the main lighting power supply fails, the light emitting diodes of the main lighting system are lit with an emergency lighting intensity, and
    wherein energy for operating the light emitting diodes is drawn from an emergency power supply during a main lighting mode for lighting the diodes at the main lighting intensity and in an emergency lighting mode for lighting the diodes at the emergency lighting intensity.

2. The rail vehicle emergency lighting system as claimed in claim 1, wherein the emergency lighting intensity is reduced compared to the main lighting intensity.

3. The rail vehicle emergency lighting as claimed in claim 1, further comprising:
    a ballast which supplies an operating voltage for operating the light emitting diodes and controls the intensity of the light emitting diodes between the main lighting intensity and the emergency lighting intensity depending on whether the main lighting power supply is active.

4. The rail vehicle emergency lighting as claimed in claim 1, wherein a transition between the main lighting intensity and the emergency lighting intensity is stepless.

5. The rail vehicle emergency lighting as claimed in claim 1, wherein a transition between the main lighting intensity and the emergency lighting intensity is time-delayed with respect to a failure of the main lighting power supply.

6. A rail vehicle emergency lighting system for a rail vehicle, comprising:
    a ballast having a first input connected to a main lighting power supply and a second input connected to an emergency lighting power supply;
    a main lighting system containing a multiplicity of light emitting diodes connected to said ballast and energized by said ballast;
    said ballast being configured to energize said light emitting diodes of the main lighting system at a main lighting intensity with power drawn from the emergency lighting power supply when the main lighting power supply is active; and
    said ballast being configured to use a feed from the main lighting power supply as a control signal and, when the main lighting power supply fails, to continue energizing said light emitting diodes of the main lighting system with power from the emergency lighting power supply, but at an emergency lighting intensity which is lower than the main lighting intensity.

* * * * *